United States Patent
Broghammer

(10) Patent No.: US 7,411,144 B2
(45) Date of Patent: Aug. 12, 2008

(54) ELECTRIC TOOL, PARTICULARLY BATTERY-OPERATED ELECTRIC TOOL

(75) Inventor: Peter Broghammer, Wurmlingen (DE)

(73) Assignee: Marquardt GmbH, Rietheim-Weilheim (DE)

( * ) Notice: Subject to any disclaimer, the term of this patent is extended or adjusted under 35 U.S.C. 154(b) by 0 days.

(21) Appl. No.: 11/621,668

(22) Filed: Jan. 10, 2007

(65) Prior Publication Data
US 2007/0108035 A1    May 17, 2007

Related U.S. Application Data

(63) Continuation of application No. PCT/EP2005/007645, filed on Jul. 14, 2005.

(30) Foreign Application Priority Data

Jul. 15, 2004    (DE) ............... 10 2004 034 092

(51) Int. Cl.
H01H 9/06    (2006.01)
(52) U.S. Cl. .................... 200/332.2; 173/217
(58) Field of Classification Search ........... 200/61.85, 200/329–332.2; 173/217; 310/50, 68 A; 320/112–114
See application file for complete search history.

(56) References Cited

U.S. PATENT DOCUMENTS 3,973,179 A * 8/1976 Weber et al. ............... 320/113
4,280,026 A * 7/1981 Alessio .................... 200/43.16
4,520,256 A * 5/1985 Doyle ....................... 219/225
6,169,258 B1 * 1/2001 Roney et al. ............. 200/332.2
6,237,698 B1 * 5/2001 Carrier et al. ................. 173/2
6,313,421 B1 * 11/2001 Abrahamsen ............. 200/332.1
6,528,749 B2 * 3/2003 Hori et al. ................... 200/293
6,768,073 B1 * 7/2004 Tondra et al. ............ 200/332.2
7,243,734 B2 * 7/2007 Wu ............................ 173/217
2003/0089511 A1    5/2003 Tsuneda et al.
2006/0038537 A1    2/2006 Heigl

FOREIGN PATENT DOCUMENTS

| DE | 196 04 346 A1 | 8/1996 |
| DE | 102 46 761 A1 | 4/2004 |
| EP | 0 951 965 A2 | 10/1999 |
| EP | 1 075 906 A2 | 2/2001 |
| EP | 1 110 678 A1 | 6/2001 |
| GB | 2 302 202 A1 | 1/1997 |

* cited by examiner

Primary Examiner—Michael A Friedhofer
(74) Attorney, Agent, or Firm—Burr & Brown

(57) ABSTRACT

An electric tool is provided, including an electric tool housing, an electric motor located in the electric tool housing, and an energy store, particularly a battery, for supplying the electric motor with energy. An actuating member for actuating a switching means for supplying the electric motor with energy is arranged in and/or on the electric tool housing. The energy store has an energy store housing, which can be fastened in and/or to the electric tool housing. The switching means is located in the energy store housing, and a transmission means which interacts with both the actuating member and the switching means, is arranged in the electric tool housing such that the movement of the actuating member is transmitted to the switching means.

32 Claims, 3 Drawing Sheets

ELECTRIC TOOL, PARTICULARLY BATTERY-OPERATED ELECTRIC TOOL

CROSS REFERENCE TO RELATED APPLICATIONS

This application is a continuation of International application Ser. No. PCT/EP2005/007645 having an international filing date of Jul. 14, 2005, which designated the United States, and claims the benefit under 35 USC §119(a)-(d) of German Application No. 10 2004 034 092.7, filed Jul. 15, 2004, the entireties of which are incorporated herein by reference.

FIELD OF THE INVENTION

The present invention relates to an electric tool.

BACKGROUND OF THE INVENTION

Electric tools, particularly battery-operated electric tools, include drill machines, screwdrivers, angle grinders, planers, routers and the like. Such an electric tool is disclosed by DE 196 04 346 A1, and has an electric tool housing in which an electric motor is located. Serving to supply the electric motor with energy is an energy store, to be precise, a battery, which in turn has an energy store housing that can be fastened in and/or to the electric tool housing. Also arranged in and/or on the electric tool housing is an actuating member, which can be actuated manually, and through which switching means for supplying the electric motor with energy can be actuated.

The switching means is arranged in the electric tool housing in a conventional manner, to be precise, generally together with the actuating member as an electric tool switch, which in turn is located in the handle of the electric tool. In some cases, such an arrangement lacks flexibility.

SUMMARY OF THE INVENTION

The object of the present invention is to provide a more flexible arrangement for the actuating member and switching means.

In the electric tool according to the present invention, the switching means is located in the energy store housing. During movement brought about by the user, the actuating member, which is located outside the energy store housing, acts on the switching means in an actuating manner. The actuating member can act on the switching means directly and/or indirectly in accordance with the structural conditions in the electric tool housing. As a result, the actuating member can be arranged at the desired point in and/or on the electric tool housing largely without restrictions, so that improved ergonomics for the user are provided. A switch arrangement for an electric tool having such a design therefore includes an actuating member being located in and/or on the electric tool housing and/or the switching means being located in the energy store housing.

Indirect action of the actuating member on the switching means can be realized in a simple manner by virtue of the fact that a transmission means, which interacts with and/or can be brought into operative connection with both the actuating member and the switching means, is arranged in the electric tool housing. The movement of the actuating member can be transmitted to the switching means by means of the transmission means.

In a cost-effective manner, the switching means may be an electric switch. However, it is especially preferred that the switching means is a sensor switch, such as a force sensor, a Hall sensor, a magneto-resistive sensor or the like. Such a sensor switch permits a compact, space-saving arrangement in the energy store housing.

The switching means may be connected to electronics for controlling the supply of energy in a known manner. These electronics may work in a pulse-width modulation manner, a leading-edge phase control manner, a trailing-edge phase control manner or the like. By means of the electronics, the electric motor is then operated with a speed assigned to the motion displacement of the actuating member, with a torque assigned to the motion displacement of the actuating member, or the like. It is also appropriate to likewise arrange the electronics in the energy store housing. As a result, the electronics are largely protected from damage during heavy-duty operation of the electric tool. At the same time, the electronics can additionally serve as at least a part of the charging electronics for charging the energy store, so that future cost savings can be achieved with such a configuration.

In a further configuration for the indirect action of the actuating member on the switching means, the transmission means may be a leaf spring. A leaf spring is fastened approximately centrally to a bearing in the electric tool housing and extends in the handle of the electric tool housing such that one end of the leaf spring is in operative connection with the actuating member and the other end of the leaf spring can be brought into operative connection with the switching means by means of the actuating member. A leaf spring designed in such a way constitutes a cost-effective, simple and yet very functionally reliable transmission means.

It is often desired for the electric motor of the electric tool to be able to operate using both clockwise and counterclockwise rotation. To this end, the one end of the leaf spring is furthermore in operative connection with an actuating element located in the electric tool housing. The bearing is designed as a pivot bearing, so that the leaf spring can be pivoted by means of the actuating element about an axis of rotation on the bearing serving as fastening point. After pivoting, the other end of the leaf spring can be brought into operative connection with a further switching element by means of the actuating member. Whereas the one switching element serves to operate the electric motor with clockwise rotation, the further switching element switches on the counterclockwise rotation of the electric motor. The two switching elements are arranged essentially side by side in the energy store housing.

A further configuration for the transmission element is that an extension is located on the other end of the leaf spring, so that the leaf spring then acts on the switching means via the extension. For simple tolerance compensation, if the switching means is designed as a sensor switch, the extension can act on the sensor switch via an elastic element. In a compact arrangement, a switching means designed as sensor switch may be located in a housing top part of the energy store housing. The elastic element is arranged as a closure in an aperture on the housing wall of the housing top part on the energy store housing. The elastic element therefore not only allows the actuation of the switching element on the inside in the energy store housing, but also at the same time serves to seal the aperture into the interior of the energy store housing.

In a configuration which is especially easy to install, the electronics are on a printed circuit board located in the energy store housing. The switching means, designed as sensor switch, is attached to the printed circuit board in an approximately perpendicularly projecting manner such that the switching means projects into the energy store housing top part.

In summary, in the electric tool according to the present invention, the complete electronics are located in the battery pack. The movement of the switch pushbutton and of the changeover lever for the clockwise/counterclockwise rotation is directed downward to the battery via a mechanical arrangement. There, two sensors are actuated which recognize the direction of rotation and transmit the stroke of the switch pushbutton to the control electronics. The switching of the load, i.e., the electric motor, takes place via power semiconductors. For cost reasons, however, the changeover function for the clockwise/counterclockwise rotation could also take place via a conventional pole-changing switch which sits on the printed circuit board or in the handle shell.

Such an arrangement is especially suitable for new battery technologies, for example for Li-ion or Li-polymer technologies, which require additional electronics in the battery pack. Such electronics in the battery pack serve to cut off the battery voltage in the event of overload, for example. According to the present invention, this electronic module in the battery pack is also used to set the speed of the electric motor, so that the conventional electronics for the speed adjustment which were hitherto located in the handle shell of the electric tool can be dispensed with. As a result, both the efficiency and the ergonomics of the electric tool are improved.

The further advantages achieved with the present invention are that the flexibility in the configuration of the electric tool is increased by virtue of the arrangement of the switching means in the energy store housing. Furthermore, the charging electronics for the energy store may be located in the energy store housing. It is then appropriate to likewise accommodate the electronics for speed control in the energy store housing, so that the switching means can be arranged directly next to the electronics. Furthermore, the charging electronics can also be at least partly used for the electronics for the speed control, so that cost savings can be achieved in this way. If the electronics are arranged in the energy store housing, then only mechanical parts are located in the handle shell of the electric tool, and as a result, the handle shell can be made to have very narrow construction. Since only a printed circuit board is required for the electronics, costs can be saved. In addition, the wiring in the electric tool is minimized. Furthermore, additional functions for the electric tool can be implemented on the printed circuit board in a simple manner. Finally, the cooling for the electronics on the printed circuit board is possible in a diverse and simple manner.

BRIEF DESCRIPTION OF THE DRAWINGS

An exemplary embodiment of the invention with various developments and configurations is shown in the drawings and is described in more detail below. In the drawings.

DETAILED DESCRIPTION OF THE INVENTION

Figure 1:
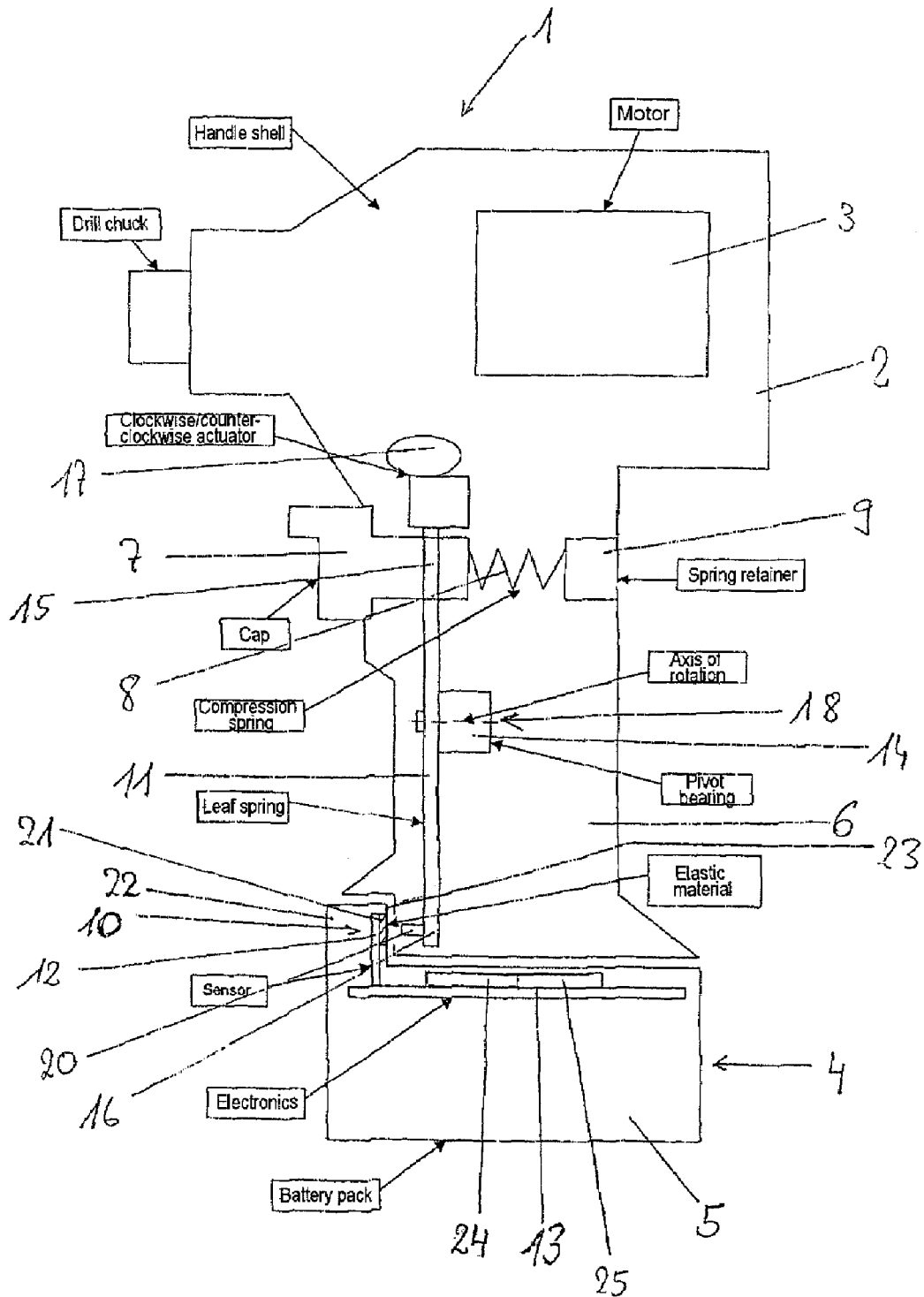
FIG. 1 schematically shows an electric tool with an energy store.
Figure 2:
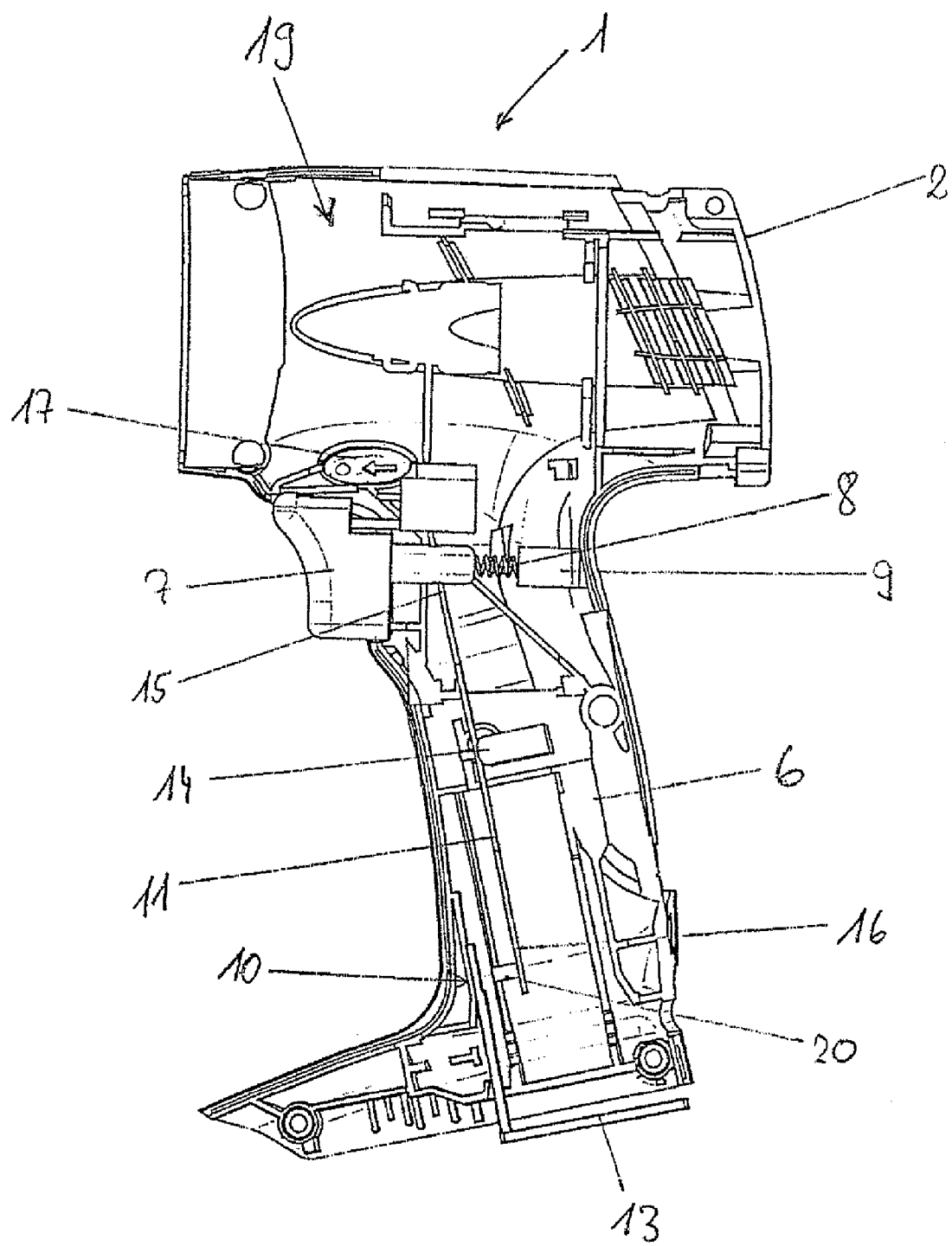
FIG. 2 shows a handle shell for the electric tool.

An electric tool 1, in this case a battery-operated drilling machine, is schematically shown in FIG. 1. The electric tool 1 has an electric tool housing 2 which consists of two halves designed as handle shells 19. One handle shell 19 is shown in more detail in FIG. 2 in such a way that the interior of the electric tool housing 2 can be seen. FIG. 1 also shows an electric motor 3, which is located in the electric tool housing 2. Serving to supply the electric motor 3 with energy is an energy store 4, which in particular is a type of battery for the power supply for the electric motor 3. The energy store 4 has an energy store housing 5 which can be fastened in and/or to the electric tool housing 2, for example, by inserting it into the handle 6 on the electric tool housing 2.

Arranged in and/or on the electric tool housing 2 is an actuating member 7 for actuating a switching means 10 for supplying the electric motor 3 with energy. The actuating member 7 can be manually actuated by the user by a depressing movement against the force of a compression spring 8, which is supported on a spring retainer 9 in the handle 6, in order thus to switch the power supply for the electric motor 3 on or off. Contrary to previously known arrangements, the switching means 10 is located in the energy store housing 5. During its movement, the actuating member 7 acts directly and/or indirectly on the switching means 10 in an actuating manner. For the indirect transmission of the movement of the actuating member 7 to the switching means 10, a transmission means 11 is arranged in the electric tool housing 2 and interacts with both the actuating member 7 and the switching means 10 and/or can be brought into operative connection with the switching means 10.

The switching means 10 may be an electric switch designed in a conventional manner and having an electromechanical contact system. It is especially preferred, however, that the switching means 10 is a sensor switch 12, such as a force sensor, a Hall sensor, a magneto-resistive sensor, a capacitive pressure sensor, or the like.

If desired, the speed of the electric motor 3 may be controlled so that the speed is set in accordance with the adjusting displacement of the actuating member 7. The adjusting displacement is produced by the user by depressing the actuating member 7. The switching means 10 is connected to electronics 24 (shown schematically in FIG. 1) for controlling the power supply for the electric motor 3. The electronics 24 may be a pulse-width-modulation circuit if the electric motor 3 is operated with direct voltage. Suitable electronics 24 in the case of an electric motor 3 operated with alternating voltage are leading-edge phase control, trailing-edge phase control, and the like. Of course, the electric motor 3 can also be operated with a torque assigned to the adjusting displacement of the actuating member 7 by means of the electronics 24. The electronics 24 are likewise arranged in the energy store housing 5 on a printed circuit board 13. At the same time, the charging circuit 25 for the energy store 4 may be located on the printed circuit board 13, so that it is possible at the same time, if need be, for electrical and/or electronic components to be used for both the electronics 24 and the charging circuit 25.

In a further configuration, a leaf spring is used as transmission means 11. The leaf spring 11 is fastened approximately centrally to a bearing 14 in the electric tool housing 2. In this case, the leaf spring 11 is arranged so as to extend in the handle 6 of the electric tool housing 2 such that one end 15 of the leaf spring 11 is in operative connection with the actuating member 7 and the other end 16 of the leaf spring 11 can be brought into operative connection with the switching means 10 by means of the actuating member 7.

Figure 3:
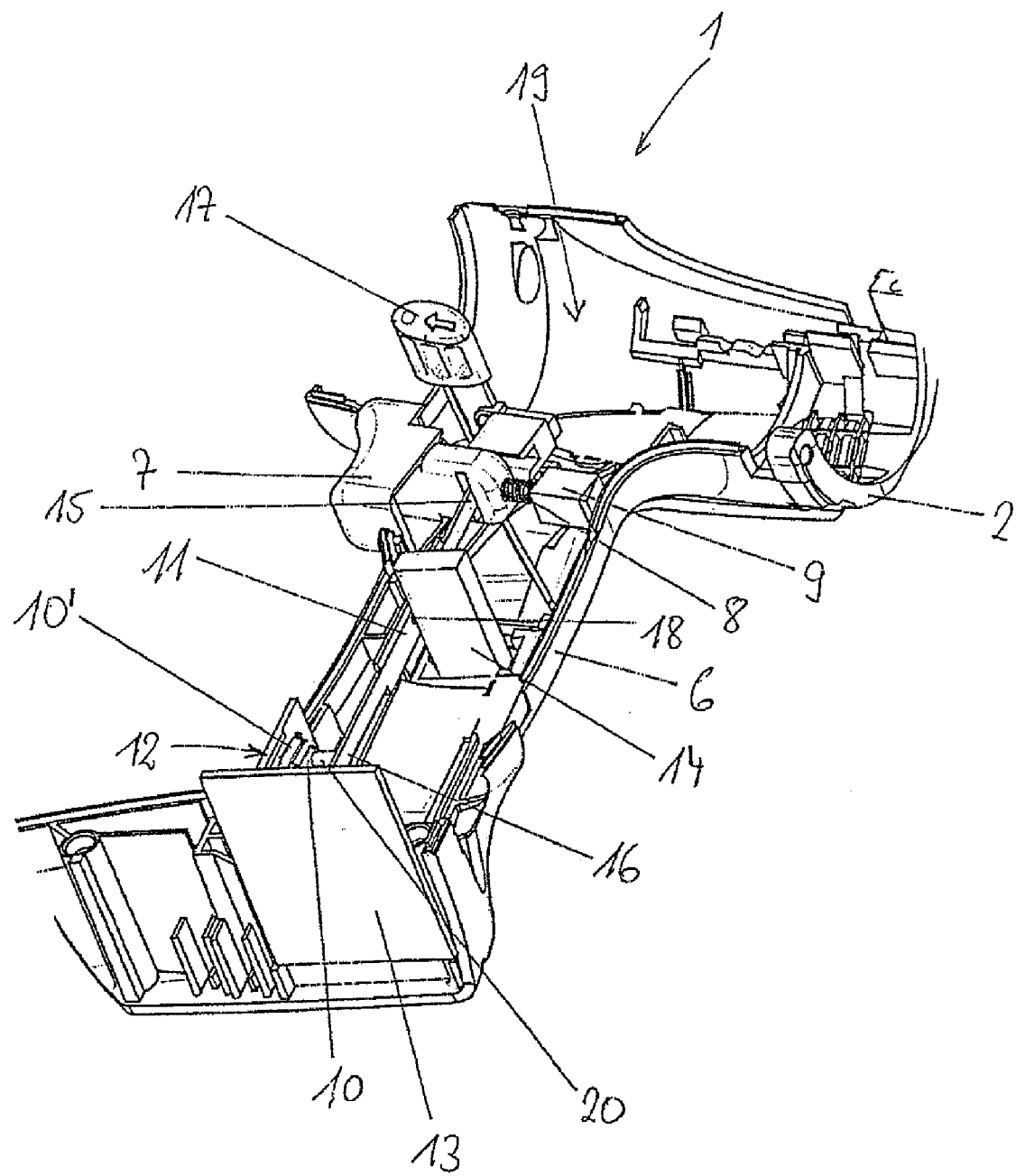
FIG. 3 shows the handle shell from FIG. 2 in a perspective view.

Furthermore, the direction of rotation of the electric motor 3 can be changed between a clockwise rotation and a counterclockwise rotation. For this purpose, located in the electric tool housing 2 is an actuating element 17, which can be displaced by the user and is likewise in operative connection with the one end 15 of the leaf spring 11. The bearing 14 is designed as a pivot bearing, so that the leaf spring 11 can be pivoted by means of the actuating element 17 about an axis 18 of rotation on the bearing 14 serving as fastening point. After the leaf spring 11 has been pivoted, its other end 16 can then be brought into operative connection with a further switching element 10' by means of the actuating member 7. The two switching elements 10, 10' are arranged essentially side by side in the energy store housing 5, as shown in FIG. 3.

FIG. 1 also shows an extension 20 located on the other end 16 of the leaf spring 11. The leaf spring 11 acts on the switching means 10, 10' via the extension 20. If the switching means 10, 10' is designed as a sensor switch 12, the extension 20 expediently acts on the sensor switch 12 via an elastic element 21. The switching means 10, 10' (designed as sensor switch 12) is located in a housing top part 22 of the energy store housing 5. The elastic element 21 is then arranged as a wall-like closure in an aperture on the housing wall 23 of the housing top part 22 of the energy store housing 5. Due to the sealing of the aperture at the housing wall 23 by means of the elastic element 21, the sensor element 12 is certainly protected in the interior of the energy store housing 5, but can nonetheless be actuated from outside by the transmission means 11.

As mentioned above, the electronics 24 for activating the electric motor 3 are provided on a printed circuit board 13 located in the energy store housing 5. It is then appropriate for the switching means 10, 10' (designed as sensor switch 12) to be attached to the printed circuit board 13 in an approximately perpendicular projecting manner, such that the switching means 10, 10' (designed as sensor switch 12) projects into the housing top part 22.

The function of the arrangement according to the present invention is explained in more detail below.

When a user depresses the actuating member 7, designed as a cap, the leaf spring 11, fixed in the axis 18 of rotation, is pressed onto the element 21, made of elastic material, which is mounted in the energy store 4 (designed as a battery pack). In the process, the leaf spring uncouples the motion displacement of the actuating member 7 and the displacement on the sensor switch 12. Due to the special material properties of the leaf spring 11, for example its modulus of elasticity, the displacement on the sensor switch 12 is minimized in the process, so that, the motion displacement of the actuating member 7 is converted essentially into a corresponding pressure acting on the sensor switch 12.

The clockwise/counterclockwise rotation function of the electric tool 1 is realized by two switching means 10, 10' (designed as sensor switch 12) which are installed side by side in the energy store 4. The two switching means 10, 10' are protected by the elastic element 21. Each individual switching means 10, 10' is responsible for one direction. During clockwise or counterclockwise rotation, the leaf spring 11 is rotated about the axis 18 of rotation of the bearing 14 and is therefore positioned in front of the sensor responsible for the respective desired direction in accordance with the respective switching means 10, 10'.

The actuating element 17 for the clockwise/counterclockwise changeover and the actuating element 7 are jointly responsible for the switch-on and changeover safety lock. The compression spring 8 is responsible for the safety of the complete resetting.

The switch arrangement for an electric tool 1 according to the above description therefore consists of the actuating member 7, located in and/or on the electric tool housing 2, and the switching means 10 located in the energy store housing 5. However, the present invention is not restricted to the exemplary embodiment described and shown. To the contrary, it also comprises all developments by a person skilled in the art within the scope of the invention defined by the patent claims. Thus the present invention, in particular the switch arrangement described herein, may not only be used in electric tools, but also in other electrical appliances which are provided with an energy store, such as electrical household appliances, electrical garden implements, machine tools, or the like.

List of numeral designations used in the specification and drawings

| | |
|---|---|
| 1 | Electric tool |
| 2 | Electric tool housing |
| 3 | Electric motor |
| 4 | Energy store |
| 5 | Energy store housing |
| 6 | Handle |
| 7 | Actuating member |
| 8 | Compression spring |
| 9 | Spring retainer |
| 10, 10' | Switching means |
| 11 | Transmission means/leaf spring |
| 12 | Sensor switch |
| 13 | Printed circuit board |
| 14 | Bearing/pivot bearing (for leaf spring) |
| 15, 16 | End (of leaf spring) |
| 17 | Actuating element |
| 18 | Axis of rotation |
| 19 | Handle shell |
| 20 | Extension |
| 21 | Elastic element |
| 22 | Housing top part |
| 23 | Housing wall |
| 24 | Electronics |
| 25 | Charging circuit/charging electronics |

What is claimed is:

1. An electric tool comprising:
an electric tool housing;
an electric motor located in the electric tool housing;
an energy store for supplying the electric motor with energy;
an actuating member operatively connected to the electric tool housing for actuating a switching means for supplying the electric motor with energy; and
an energy store housing removably attached to the electric tool housing;
wherein the switching means is located in the energy store housing, and the actuating member, during movement, acts in at least one of a direct and an indirect manner on the switching means to actuate the switching means;
said electric tool further comprising transmission means, that operatively interacts with both the actuating member and the switching means, arranged in the electric tool housing to transmit movement of the actuating member to the switching means, wherein the transmission means is a leaf spring arranged to extend in the electric tool housing such that a first end of the leaf spring is in operative connection with the actuating member and a second end of the leaf spring is brought into operative connection with the switching means via the actuating member.

2. The electric tool as claimed in claim 1, wherein the switching means comprises an electric switch.

3. The electric tool as claimed in claim 1, wherein the switching means comprises a sensor switch.

4. The electric tool as claimed in claim 3, wherein the sensor switch comprises one of a force sensor, a Hall sensor, and a magneto-resistive sensor.

5. The electric tool as claimed in claim 1, wherein the switching means is connected to electronics, arranged in the energy store housing, for controlling the energy supply such that the electric motor is operated with one of a speed assigned to motion displacement of the actuating member and a torque assigned to motion displacement of the actuating member.

6. The electric tool as claimed in claim 5, wherein the electronics are provided on a printed circuit board located in the energy store housing, and wherein the switching means comprises a sensor switch attached to the printed circuit board in an approximately perpendicularly projecting manner.

7. The electric tool as claimed in claim 6, wherein the switching means projects into a top part of the energy store housing.

8. The electric tool as claimed in claim 5, wherein the electronics control the energy supply in one of a pulse-width modulation manner, a leading-edge phase control manner and a trailing-edge phase control manner.

9. The electric tool as claimed in claim 5, wherein the electronics include electronics for charging the energy store.

10. The electric tool as claimed in claim 1, wherein the first end of the leaf spring is in operative connection with an actuating element located in the electric tool housing, wherein a pivot bearing is provided so that the leaf spring is pivoted via the actuating element about an axis of rotation on the pivot bearing serving as a fastening point, wherein, after pivoting, the second end of the leaf spring is brought into operative connection with a switching element via the actuating member, and wherein the switching element and the switching means are arranged side by side in the energy store housing.

11. The electric tool as claimed in claim 1, wherein an extension is located on the second end of the leaf spring, so that the leaf spring acts on the switching means via the extension.

12. The electric tool as claimed in claim 11, wherein the switching means comprises a sensor switch located in a top part of the energy store housing.

13. The electric tool as claim in claim 12, wherein the extension acts on the sensor switch via an elastic element arranged as a closure in an aperture on the top part of the energy store housing.

14. The electric tool as claimed in claim 1, wherein the energy store is a battery.

15. The electric tool as claimed in claim 1, wherein the transmission means is brought into an operative connection with both the actuating member and the switching means.

16. The electric tool as claimed in claim 1, wherein the transmission means is fastened approximately centrally to a bearing in the electric tool housing.

17. An electric tool comprising:
an electric tool housing;
an electric motor located in the electric tool housing;
an energy store for supplying the electric motor with energy;
an actuating member operatively connected to the electric tool housing for actuating a sensor switch for supplying the electric motor with energy; and
an energy store housing removably attached to the electric tool housing,
wherein the sensor switch is located in the energy store housing, and the actuating member, during movement, acts in at least one of a direct and an indirect manner on the sensor switch to actuate the sensor switch.

18. The electric tool as claimed in claim 17, wherein the sensor switch comprises one of a force sensor, a Hall sensor, and a magneto-resistive sensor.

19. The electric tool as claimed in claim 17, further comprising a transmission means, that operatively interacts with both the actuating member and the sensor switch, arranged in the electric tool housing such that movement of the actuating member is transmitted to the sensor switch.

20. The electric tool as claimed in claim 19, wherein the transmission means is brought into an operative connection with both the actuating member and the sensor switch.

21. The electric tool as claimed in claim 17, wherein the sensor switch is connected to electronics, arranged in the energy store housing, for controlling the energy supply such that the electric motor is operated with one of a speed assigned to motion displacement of the actuating member and a torque assigned to motion displacement of the actuating member.

22. The electric tool as claimed in claim 21, wherein the electronics are provided on a printed circuit board located in the energy store housing, and wherein the sensor switch is attached to the printed circuit board in an approximately perpendicularly projecting manner.

23. The electric tool as claimed in claim 22, wherein the sensor switch projects into a top part of the energy store housing.

24. The electric tool as claimed in claim 21, wherein the electronics control the energy supply in one of a pulse-width modulation manner, a leading-edge phase control manner and a trailing-edge phase control manner.

25. The electric tool as claimed in claim 21, wherein the electronics include electronics for charging the energy store.

26. The electric tool as claimed in claim 19, wherein the transmission means is a leaf spring arranged to extend in the electric tool housing such that a first end of the leaf spring is in operative connection with the actuating member and a second end of the leaf spring is brought into operative connection with the sensor switch via the actuating member.

27. The electric tool as claimed in claim 26, wherein the first end of the leaf spring is in operative connection with an actuating element located in the electric tool housing, wherein a pivot bearing is provided so that the leaf spring is pivoted via the actuating element about an axis of rotation on the pivot bearing serving as a fastening point, wherein, after pivoting, the second end of the leaf spring is brought into operative connection with a switching element via the actuating member, and wherein the switching element and the sensor switch are arranged side by side in the energy store housing.

28. The electric tool as claimed in claim 26, wherein an extension is located on the second end of the leaf spring, so that the leaf spring acts on the sensor switch via the extension.

29. The electric tool as claimed in claim 28, wherein the sensor switch is located in a top part of the energy store housing.

30. The electric tool as claim in claim 29, wherein the extension acts on the sensor switch via an elastic element arranged as a closure in an aperture on the top part of the energy store housing.

31. The electric tool as claimed in claim 26, wherein the transmission means is fastened approximately centrally to a bearing in the electric tool housing.

32. The electric tool as claimed in claim 17, wherein the energy store is a battery.

* * * * *